(12) United States Patent
Motoyama

(10) Patent No.: US 10,500,945 B2
(45) Date of Patent: Dec. 10, 2019

(54) EXHAUST GAS CLEANING APPARATUS

(71) Applicant: KABUSHIKI KAISHA TOYOTA JIDOSHOKKI, Kariya-shi, Aichi-ken (JP)

(72) Inventor: Yuto Motoyama, Aichi-ken (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 0 days.

(21) Appl. No.: 15/866,817

(22) Filed: Jan. 10, 2018

(65) Prior Publication Data

US 2018/0194218 A1  Jul. 12, 2018

(30) Foreign Application Priority Data

Jan. 11, 2017 (JP) .................. 2017-002605

(51) Int. Cl.
*B60K 13/04* (2006.01)
*F01N 3/02* (2006.01)
(Continued)

(52) U.S. Cl.
CPC .............. *B60K 13/04* (2013.01); *B01D 53/94* (2013.01); *F01N 3/021* (2013.01); *F01N 3/0233* (2013.01);
(Continued)

(58) Field of Classification Search
CPC .. B01D 53/94; B01D 46/4227; B01D 46/008; B01D 46/2411; B01D 46/2422;
(Continued)

(56) References Cited

U.S. PATENT DOCUMENTS 8,420,019 B2 * 4/2013 Saito .................. E02F 9/0883
422/180
8,764,866 B2 * 7/2014 Mitsuda .................. B05D 1/40
55/385.3
2010/0269494 A1  10/2010 Saito et al.

FOREIGN PATENT DOCUMENTS

EP  1371825 A1  12/2003
JP  63-119818 U1  8/1988
(Continued)

OTHER PUBLICATIONS

Communication dated Mar. 19, 2018, from the European Patent Office in counterpart European Application No. 18150142.0.

*Primary Examiner* — Patrick D Maines
*Assistant Examiner* — Dapinder Singh
(74) *Attorney, Agent, or Firm* — Sughrue Mion, PLLC

(57) ABSTRACT

There is provided an exhaust gas cleaning apparatus for cleaning exhaust gas discharged from an internal combustion engine that includes an upstream side exhaust pipe and a downstream side exhaust pipe that are located on an upstream side and a downstream side, respectively, with respect to a flow direction of the exhaust gas discharged from the internal combustion engine. A filter unit is disposed between the upstream side exhaust pipe and the downstream side exhaust pipe and removably connected at opposite sides thereof to the upstream side exhaust pipe and the downstream side exhaust pipe. The filter unit includes a filter that captures particulate matter contained in the exhaust gas flowing in the upstream side exhaust pipe, a casing in which the filter is accommodated, and a thermal insulator that covers an entire outer peripheral surface of the casing. A handle is provided on the thermal insulator.

3 Claims, 2 Drawing Sheets

(51) Int. Cl.
  *F01N 13/00* (2010.01)
  *F01N 13/14* (2010.01)
  *F01N 3/023* (2006.01)
  *F01N 3/035* (2006.01)
  *B01D 53/94* (2006.01)
  *F01N 3/021* (2006.01)

(52) U.S. Cl.
  CPC .............. *F01N 3/035* (2013.01); *F01N 13/14* (2013.01); *F01N 13/141* (2013.01); *F01N 2260/00* (2013.01); *F01N 2450/30* (2013.01); *F01N 2590/08* (2013.01); *Y02T 10/20* (2013.01)

(58) Field of Classification Search
  CPC ................ B01D 53/92; B01D 53/9431; B01D 2279/30; B60K 13/04; F01N 13/14; F01N 13/141; F01N 3/021; F01N 3/0233; F01N 3/035; F01N 2260/00; F01N 2450/30; F01N 2590/08; F01N 3/2583; F01N 3/22857; F01N 3/2842; F01N 3/2839; F01N 3/0211; Y02T 10/20
  USPC ............ 60/274, 297, 311; 55/523, 356, 357, 55/DIG. 30
  See application file for complete search history.

(56) References Cited

FOREIGN PATENT DOCUMENTS

| | | |
|---|---|---|
| JP | 2002-97927 A | 4/2002 |
| JP | 2010-019188 A | 1/2010 |
| JP | 2010-174666 A | 8/2010 |
| KR | 20-1999-0015652 U | 5/1999 |

\* cited by examiner

EXHAUST GAS CLEANING APPARATUS

BACKGROUND

The present disclosure relates to an exhaust gas cleaning apparatus for cleaning exhaust gas that is discharged from an internal combustion engine.

An exhaust gas cleaning apparatus, that is mounted on a vehicle, captures particulate matter (PM) contained in the exhaust gas that is discharged from an internal combustion engine of the vehicle using a diesel particulate filter (DPF) unit. A capturing capacity of the DPF unit may be limited. Therefore, when the amount of PM accumulated in the DPF unit exceeds a predetermined limit, a DPF regeneration process needs to be performed by increasing the temperature of the exhaust gas to a level at which PM combusts to thereby remove the accumulated PM from the DPF unit.

Meanwhile, ash which is derived from engine oil components and contained in the exhaust gas also accumulates in the DPF unit during operation of the vehicle. Ash is decomposed at temperatures exceeding 1,000° C. Therefore, ash is not removed from the DPF unit during a normal DPF regeneration process and continues to accumulate in the DPF unit. In order to prevent the accumulation of an excessive amount of ash and the clogging of the DPF unit due to the accumulated ash, the DPF unit needs to be cleaned or replaced periodically.

According to the exhaust gas cleaning apparatus mentioned by Japanese Unexamined Patent Application Publication No. 2010-19188, for example, handles are provided on an outer peripheral surface of the DPF casing that is connected between an upstream side exhaust pipe and a downstream side exhaust pipe. During maintenance of the DPF unit, a worker utilizes the handles to remove the DPF unit from the upstream side exhaust pipe and the downstream side exhaust pipe.

Based on size constraints of the vehicle, various components of the exhaust gas cleaning apparatus and various components of the internal combustion engine are commonly arranged in the vicinity of the DPF unit, and as such the DPF unit is capable of being heated to a high temperature. Therefore, there is a need to prevent thermal damage to such components caused by heat that is radiated from the heated DPF unit.

To reduce heat damage, it may be contemplated to provide a thermal insulator on the outer peripheral surface of the DPF casing. However, in the case of an exhaust gas cleaning apparatus having handles like the apparatus mentioned in the above-mentioned publication, it is difficult to cover the entire outer peripheral surface of the DPF casing due to the presence of the handles.

The present disclosure is directed to providing an exhaust gas cleaning apparatus which is configured to permit easy removal of the DPF unit from the upstream side exhaust pipe and the downstream side exhaust pipe and which is capable of reducing thermal damage due to heat radiation of the DPF unit.

SUMMARY

In accordance with an aspect of the present disclosure, an exhaust gas cleaning apparatus for cleaning exhaust gas that is discharged from an internal combustion engine is provided. The exhaust gas cleaning apparatus includes an upstream side exhaust pipe and a downstream side exhaust pipe that are located on an upstream side and a downstream side, respectively, with respect to a flow direction of the exhaust gas that is discharged from the internal combustion engine. The exhaust gas cleaning apparatus further includes a filter unit that is disposed between the upstream side exhaust pipe and the downstream side exhaust pipe and is removably connected at opposite sides thereof to the upstream side exhaust pipe and the downstream side exhaust pipe. The filter unit includes a filter that captures particulate matter contained in the exhaust gas flowing in the upstream side exhaust pipe, a casing in which the filter is accommodated, and a thermal insulator that covers an entire outer peripheral surface of the casing. A handle is provided on the thermal insulator.

Other aspects and advantages of the disclosure will become apparent from the following description and accompanying drawings that illustrate, by way of example, the principles of the disclosure.

DETAILED DESCRIPTION OF THE EMBODIMENTS

Figure 1:
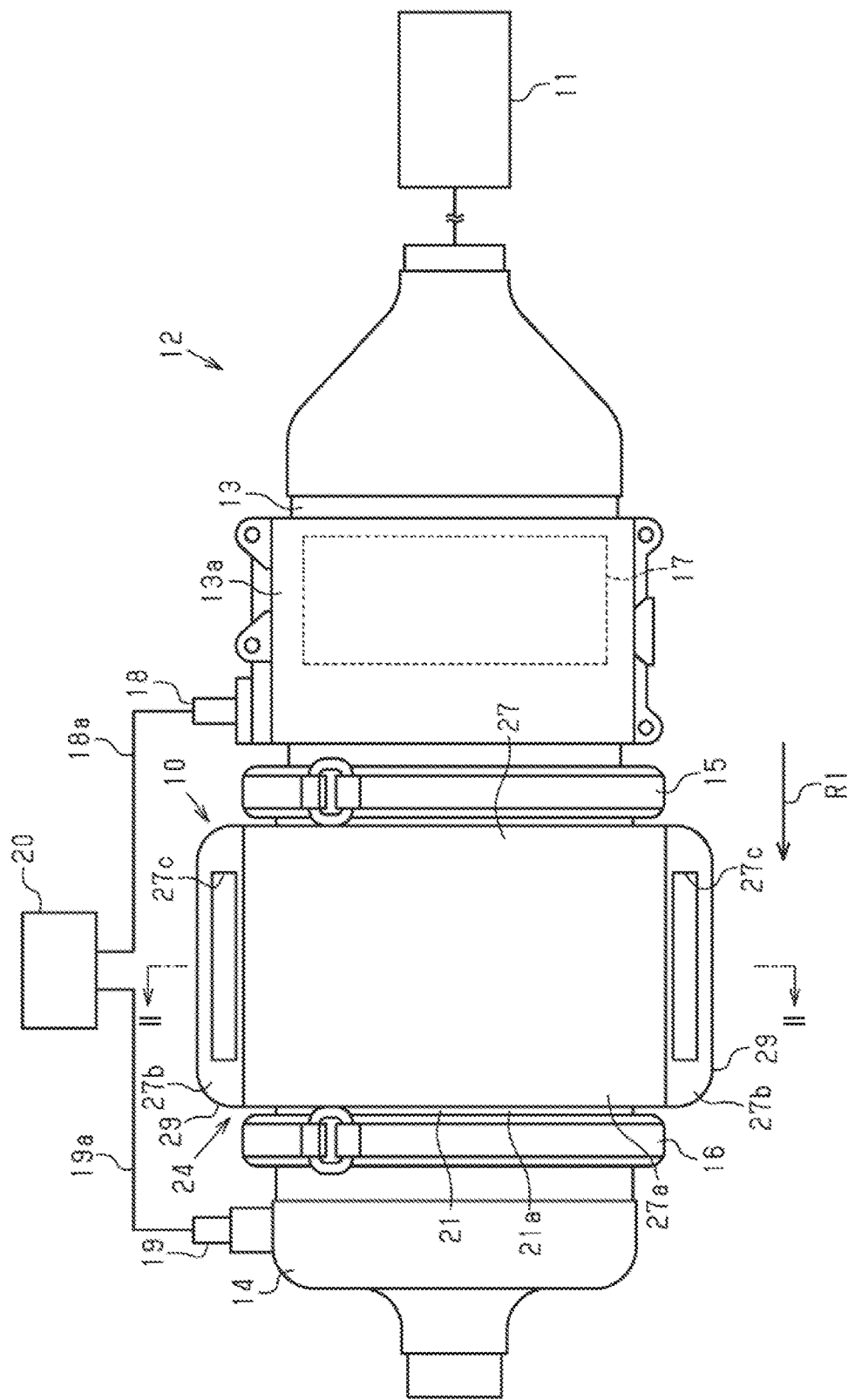
FIG. 1 is a side view of an exhaust gas cleaning apparatus according to an embodiment of the present disclosure.
Figure 2:
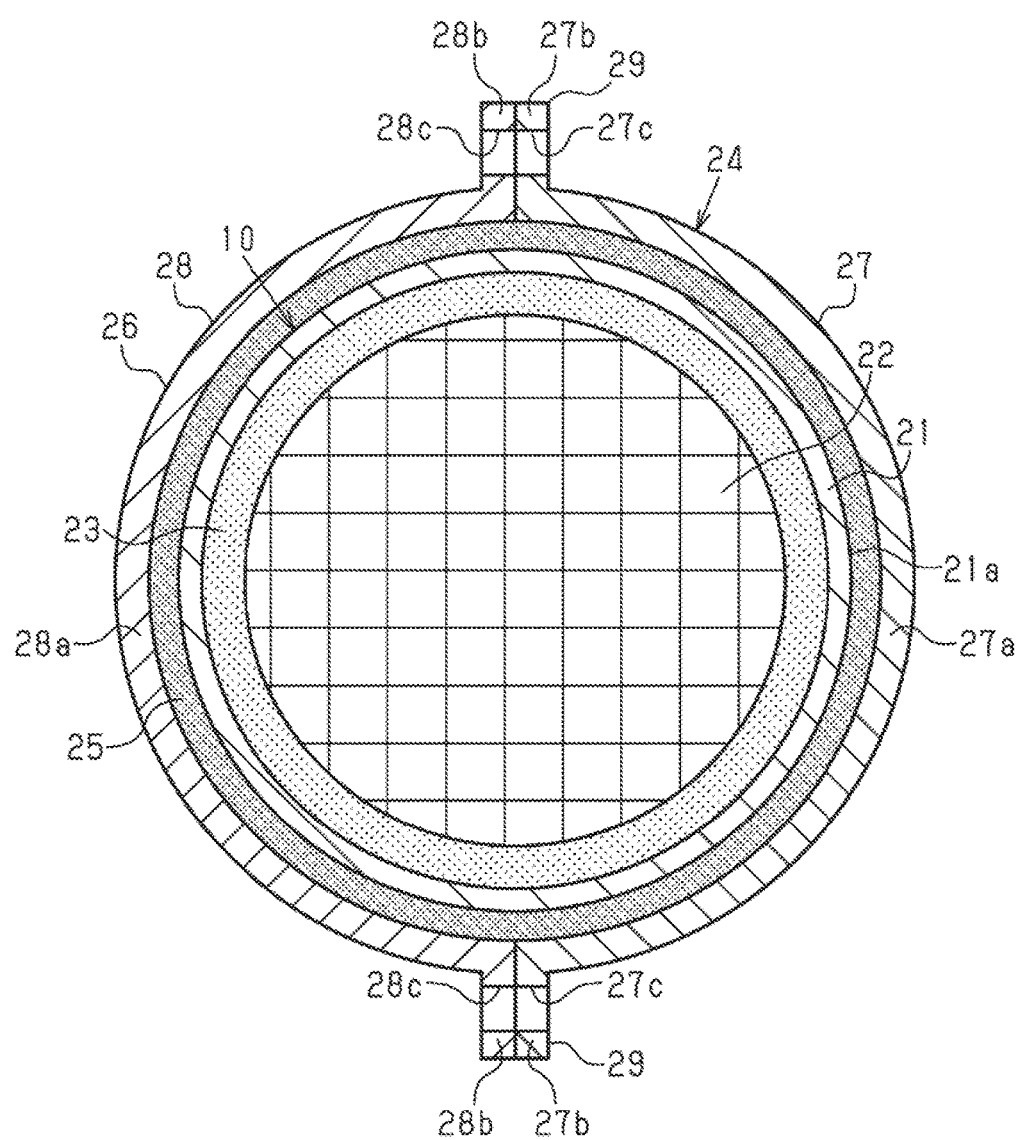
FIG. 2 is a cross sectional view taken along line II-II of FIG. 1.

The following will describe an embodiment of an exhaust gas cleaning apparatus according to the present disclosure with reference to FIGS. 1 and 2. The exhaust gas cleaning apparatus of the present embodiment is adapted for use in a vehicle having an internal combustion engine. For example, the exhaust gas cleaning apparatus may be implemented in an industrial vehicle, such as a forklift truck, having a diesel engine as a power source.

FIG. 1 depicts an exhaust gas cleaning apparatus of the present embodiment. As shown in FIG. 1, a diesel particulate filter (DPF) unit 10 is disposed in an exhaust passage 12 that is connected to an exhaust side of an internal combustion engine 11. The DPF unit 10 captures particulate matter (PM) contained in exhaust gas that flows in the exhaust passage 12. The exhaust passage 12 includes an upstream side exhaust pipe 13 and a downstream side exhaust pipe 14. The upstream side exhaust pipe 13 is located upstream of the DPF unit 10 with respect to a flow direction R1 (indicated by an arrow in FIG. 1) of the exhaust gas in the exhaust passage 12, and forms a part of the exhaust passage 12. The downstream side exhaust pipe 14 is located downstream of the DPF unit 10 with respect to the flow direction R1 of the exhaust gas in the exhaust passage 12, and forms a part of the exhaust passage 12.

The DPF unit 10 and the upstream side exhaust pipe 13 are connected via an upstream side clamp 15 having a V-shape. The DPF unit 10 and the downstream side exhaust pipe 14 are connected via a downstream side clamp 16 having a V-shape. The DPF unit 10 is removable from the upstream side exhaust pipe 13 and the downstream side exhaust pipe 14 by removing the upstream side clamp 15 and the downstream side clamp 16. In other words, the DPF unit 10 is removably connected to the upstream side exhaust pipe 13 and the downstream side exhaust pipe 14.

A diesel oxidation catalyst (DOC) 17 is provided within the upstream side exhaust pipe 13. The DOC 17 is a catalyst used for oxidizing hydrocarbon (HC) contained in the exhaust gas and accelerating combustion of PM. A thermal insulator 13a for the DOC 17 is provided on an outer peripheral surface of the upstream side exhaust pipe 13. The thermal insulator 13a covers at least the entire circumference of a part of the upstream side exhaust pipe 13 in which the DOC 17 is provided. The thermal insulator 13a shields heat that is generated from the DOC 17.

An upstream side temperature sensor 18 is mounted to the upstream side exhaust pipe 13 at a position that is downstream of the DOC 17. The upstream side temperature sensor 18 detects a temperature of the exhaust gas in the upstream side exhaust pipe 13 that has passed through the DOC 17 and is about to pass through the DPF unit 10. The upstream side temperature sensor 18 is electrically connected to an electronic control unit (ECU) 20 of the vehicle through a first wire 18a.

A downstream side temperature sensor 19 is mounted to the downstream side exhaust pipe 14. The downstream side temperature sensor 19 detects a temperature of the exhaust gas that flows in the downstream side exhaust pipe 14 after passing through the DPF unit 10. The downstream side temperature sensor 19 is electrically connected to the ECU 20 through a second wire 19a.

As shown in FIG. 2, the DPF unit 10 includes a substantially cylindrical casing 21 comprised of a metal, and a filter 22 that is disposed within the casing 21. That is, the casing 21 accommodates the filter 22. The filter 22 is comprised of a porous ceramic and captures PM contained in the exhaust gas. An inner peripheral surface of the casing 21 is lined with a cylindrical anti-vibration mat 23, which is comprised of glass wool or the like. The filter 22 is disposed radially inward of the casing 21 such that the filter 22 is in close contact with an inner peripheral surface of the anti-vibration mat 23. With this arrangement, the anti-vibration mat 23 reduces an amount of vibration that is transmitted from the filter 22 to the casing 21, and also reduces an amount of vibration that is transmitted from the casing 21 to the filter 22.

The DPF unit 10 further includes a thermal insulator 24 that covers an entire outer peripheral surface 21a of the casing 21. The thermal insulator 24 includes a cylindrical thermal insulation member 25, and a cylindrical holder unit 26.

The thermal insulation member 25 is provided so as to cover the entire outer peripheral surface 21a of the casing 21. The thermal insulation member 25 is comprised of glass wool or the like.

The holder unit 26 is configured to secure the thermal insulation member 25 on the outer peripheral surface 21a of the casing 21.

The holder unit 26 is comprised of a first half part 27 and a second half part 28 that are comprised of aluminum or the like. The thermal insulation member 25 and the holder unit 26 cooperate to shield the heat that is emitted from the casing 21 which is heated by the hot exhaust gas that flows in the filter 22.

The first half part 27 includes a first covering portion 27a extending circumferentially along the outer peripheral surface of the thermal insulation member 25, and a pair of first flanges 27b located at opposite ends of the first covering portion 27a in the circumferential direction and extending radially outward. The first covering portion 27a extends along a first half of the circumference of the thermal insulation member 25 or, in other words, an arc of 180 degrees. The first flanges 27b are located at positions 180 degrees away from each other in the circumferential direction of the first covering portion 27a.

Each first flange 27b has a rectangular plate shape. The longitudinal direction of the first flanges 27b corresponds to the axial direction of the casing 21. Each first flange 27b includes a rectangular-shaped opening 27c. The longitudinal direction of the opening 27c corresponds to the longitudinal direction of the first flange 27b.

The second half part 28 includes a second covering portion 28a extending circumferentially along the outer peripheral surface of the thermal insulation member 25, and a pair of second flanges 28b located at opposite ends of the second covering portion 28a in the circumferential direction and extending radially outward. The second covering portion 28a extends along a second half of the circumference of the thermal insulation member 25 or, in other words, an arc of 180 degrees. The second flanges 28b are located at positions 180 degrees away from each other in the circumferential direction of the second covering portion 28a.

Each second flange 28b has a rectangular plate shape. The longitudinal direction of the second flanges 28b corresponds to the axial direction of the casing 21. Each second flange 28b includes a rectangular opening 28c. The longitudinal direction of the opening 28c corresponds to the longitudinal direction of the second flange 28b.

The first half part 27 and the second half part 28 are connected to each other at the first flanges 27b and the second flanges 28b with the opening 27c and the opening 28c aligned and communicating with each other at the opposite ends of the respective first half part 27 and the second half part 28. The mating surfaces between the first flanges 27b and the second flanges 28b are joined together by welding so as to form a single integral unit of the holder unit 26. The outer peripheral surface of the thermal insulation member 25 is entirely surrounded by the first covering portion 27a of the first half part 27 and the second covering portion 28a of the second half part 28. In other words, the holder unit 26 surrounds the entire outer peripheral surface of the thermal insulation member 25.

The openings 27c of the first flanges 27b and the openings 28c of the second flanges 28b include respective sizes that can accommodate hands of a worker. Therefore, a worker can hold the joined parts of the first flanges 27b and the second flanges 28b using his or her hand. In this way, the first flanges 27b and the second flanges 28b serve as handles 29 that are held by the worker during the maintenance of the exhaust gas cleaning apparatus or on similar occasions. In other words, the thermal insulator 24 has two handles 29. The handles 29 according to the present embodiment are formed integrally with the holder unit 26.

The following will describe the function of the present embodiment.

The amount of PM accumulated in the filter 22 increases with the use of the DPF unit 10. Since the filter 22 has a PM accumulation capacity, a DPF regeneration process needs to be executed when the amount of PM accumulated in the filter 22 exceeds a predetermined limit. During the DPF regeneration process, the temperature of the exhaust gas is raised to combust and remove the PM accumulated in the filter 22.

Exhaust gas contains ash as well as PM. Ash decomposes at a temperature of 1,000° C. or at temperatures exceeding 1,000° C., which is greater than the temperature at which PM combusts. Therefore, the ash might not be removed by the above-described DPF regeneration process. In order to prevent the clogging of the filter 22 due to the excessive accumulation of ash in the filter 22, maintenance work such as periodic cleaning of the filter 22 and replacement of the DPF unit 10 is required.

During maintenance of the DPF unit 10, the worker removes the upstream side clamp 15 and the downstream side clamp 16 so that the DPF unit 10 is ready for removal from the upstream side exhaust pipe 13 and the downstream side exhaust pipe 14. Then, the worker, using the handles 29, removes the thermal insulator 24 and the DPF unit 10 by pulling the thermal insulator 24 in a direction (e.g., upward) away from the upstream side exhaust pipe 13 and the downstream side exhaust pipe 14. In this way, the worker, using the handles 29, moves the DPF unit 10 in a direction away from the upstream side exhaust pipe 13 and the downstream side exhaust pipe 14 to thereby remove the DPF unit 10 from the upstream side exhaust pipe 13 and the downstream side exhaust pipe 14 to permit maintenance.

The casing 21 and the filter 22 are heated to a high temperature during the DPF regeneration process. However, radiation of heat from the DPF unit 10 is suppressed by the thermal insulator 24 covering the entire outer peripheral surface 21a of the casing 21. With this configuration, thermal damage to the components, such as the upstream side temperature sensor 18, the downstream side temperature sensor 19, the first wire 18a, and the second wire 19a, that are located in the vicinity of the DPF unit 10 is prevented.

The above embodiment offers the following effects.

(1) In the exhaust gas cleaning apparatus of the present embodiment in which the thermal insulator 24 has the handles 29, the DPF unit 10 is removed easily from the upstream side exhaust pipe 13 and the downstream side exhaust pipe 14 by holding the handles 29 and lifting the thermal insulator 24 away from the upstream side exhaust pipe 13 and the downstream side exhaust pipe 14. If the handles 29 are provided on the outer peripheral surface 21a of the casing 21, the outer peripheral surface 21a cannot be covered entirely by the thermal insulator 24 due to the presence of the handles 29. However, according to the above embodiment in which the outer peripheral surface of the casing 21 of the DPF unit 10 is covered entirely by the thermal insulator 24, radiation of heat from the DPF unit 10 is blocked by the thermal insulator 24.

(2) The thermal insulator 24 includes the thermal insulation member 25 covering the outer peripheral surface 21a of the casing 21 and the holder unit 26 covering and holding the thermal insulation member 25 on the casing 21. The handles 29 are formed integrally with the holder unit 26. With this configuration, the number of parts used in the exhaust gas cleaning apparatus is reduced and the structure of the exhaust gas cleaning apparatus is simplified as compared with an exhaust gas cleaning apparatus in which the handles 29 are parts that are separate from the thermal insulator 24 and mounted to the thermal insulator 24.

(3) If the handles 29 are mounted directly to the casing 21, the worker cannot hold the heated handles 29 until the handles 29 are sufficiently cooled. However, according to the above embodiment, the handles 29 which are provided on the thermal insulator 24 are prevented from being heated by the heat from DPF unit 10. Therefore, the worker does not need to wait for the handles 29 to be cooled, so that the maintenance of the DPF unit 10 is performed smoothly.

(4) Two handles 29 are provided on the thermal insulator 24. This configuration provides more options in the direction in which the DPF unit 10 is moved for removal from the upstream side exhaust pipe 13 and the downstream side exhaust pipe 14 and enhances the maintainability of the DPF unit 10, as compared with an exhaust gas cleaning apparatus having only a single handle 29 on the thermal insulator 24.

It is to be noted that the above embodiment may be modified as exemplified below.

In the above embodiment, each first flange 27b has an opening 27c, and each second flange 28b has an opening 28c. However, the opening 27c may be formed in one of the two first flanges 27b and the opening 28c may be formed in one of the two second flanges 28b. In this case, the first half part 27 and the second half part 28 of the holder unit 26 are assembled together with the first flange 27b having the opening 27c with the second flange 28b having the opening 28c aligned with each other so that the openings 27c and 28c communicate with each other. Then, a single handle 29 is formed by the first flange 27b having the opening 27c and the second flange 28b having the opening 28c. In other words, according to an example embodiment of the present disclosure, a single handle 29 may be provided on the thermal insulator 24.

According to the present disclosure, the openings 27c may not be formed in the first flanges 27b and, alternatively, a recess may be formed in each first flange 27b on the side thereof facing away from the mating second flange 28b. Likewise, the openings 28c may not be formed in the second flanges 28b and a recess may alternatively be formed in each second flange 28b on the side thereof facing away from the mating first flange 27b. In this case, the worker holds the handles 29 by hooking his or her thumb and fingers to the recesses of the first flanges 27b and the second flanges 28b.

In the above embodiment, the handles 29 may be provided by members that are separate from the thermal insulator 24, and the handles 29 may be mounted to the holder unit 26.

The exhaust gas cleaning apparatus of the above embodiment may be mounted to an industrial vehicle other than forklift trucks.

The exhaust gas cleaning apparatus of the above embodiment may be mounted to vehicles other than industrial vehicles. It should be understood that implementations described herein are applicable to any type of vehicle.

What is claimed is:

1. An exhaust gas cleaning apparatus for cleaning exhaust gas that is discharged from an internal combustion engine, comprising:
    an upstream side exhaust pipe and a downstream side exhaust pipe that are located on an upstream side and a downstream side, respectively, with respect to a flow direction, of the exhaust gas that is discharged from the internal combustion engine;
    a filter unit that is disposed between the upstream side exhaust pipe and the downstream side exhaust pipe and that is removably connected to the upstream side exhaust pipe and the downstream side exhaust pipe, wherein
    the filter unit comprises:
        a filter configured to capture particulate matter contained in the exhaust gas;
        a casing in which the filter is accommodated; and
        a thermal insulator that covers an entire outer peripheral surface of the casing, and wherein
    the thermal insulator includes a handle.

2. The exhaust gas cleaning apparatus according to claim 1, wherein
    the thermal insulator includes thermal insulation material that covers the outer peripheral surface of the casing, and
    a holder that covers the thermal insulation material to secure the thermal insulation material on the casing, wherein
    the handle is formed integrally with the holder.

3. The exhaust gas cleaning apparatus according to claim 2, wherein the holder includes a first half part and a second half part that extend circumferentially along the outer peripheral surface of the thermal insulation material, each of the first half part and the second half part including a flange that extends radially outward from the thermal insulation material, and includes an opening therein, so as to form the handle.

* * * * *